United States Patent
Hu et al.

(10) Patent No.: US 11,258,701 B2
(45) Date of Patent: Feb. 22, 2022

(54) METHOD AND DEVICE FOR INTERWORKING BETWEEN SERVICE FUNCTION CHAIN DOMAINS

(71) Applicant: NOKIA SOLUTIONS AND NETWORKS OY, Espoo (FI)

(72) Inventors: Zhiyuan Hu, Shanghai (CN); Mingyu Zhao, Shanghai (CN); Lina Wang, Shanghai (CN); Zhigang Luo, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 5 days.

(21) Appl. No.: 15/733,425

(22) PCT Filed: Feb. 1, 2019

(86) PCT No.: PCT/CN2019/074450
§ 371 (c)(1),
(2) Date: Jul. 24, 2020

(87) PCT Pub. No.: WO2019/149273
PCT Pub. Date: Aug. 8, 2019

(65) Prior Publication Data
US 2020/0358696 A1 Nov. 12, 2020

(30) Foreign Application Priority Data
Feb. 1, 2018 (CN) .......................... 201810101927.2

(51) Int. Cl.
*H04W 56/00* (2009.01)
*H04L 45/30* (2022.01)
(Continued)

(52) U.S. Cl.
CPC ............ *H04L 45/306* (2013.01); *H04L 45/22* (2013.01); *H04L 47/2441* (2013.01); *H04L 69/08* (2013.01)

(58) Field of Classification Search
CPC ... H04L 45/306; H04L 45/22; H04L 47/2441; H04L 69/08
See application file for complete search history.

(56) References Cited

U.S. PATENT DOCUMENTS

| | | | |
|---|---|---|---|
| 2016/0014016 A1 | 1/2016 | Guichard et al. | |
| 2016/0165014 A1 | 6/2016 | Nainar et al. | |

(Continued)

FOREIGN PATENT DOCUMENTS

| | | |
|---|---|---|
| CN | 105681198 A | 6/2016 |
| WO | 2016000513 A1 | 1/2016 |

(Continued)

OTHER PUBLICATIONS

International Search Report and Written Opinion for International Application No. PCT/CN2019/074450, dated Apr. 22, 2019 (6 pages).

(Continued)

*Primary Examiner* — Sai Ming Chan
(74) *Attorney, Agent, or Firm* — Brake Hughes Bellermann LLP

(57) ABSTRACT

Embodiments of the present disclosure relate to method and device for interworking between service function chain (i.e., service chain) domains In some embodiments, there is provided a communication method comprising: receiving, at a first logic node of a first service chain in a first domain, a first packet associated with a second service chain in a second domain; converting the first packet into a second packet comprising first interworking information between the first service chain and the second service chain, the first (Continued)

interworking information comprising a flag indicating that the second packet is an interworking packet, an address of the first logic node, a first flow identifier of the second packet, a first service path identifier of the second packet and metadata associated with the second service chain; transmitting the second packet to a second logic node in the second domain; and receiving from the second logic node a response to the metadata.

26 Claims, 11 Drawing Sheets

(51) Int. Cl.
    *H04L 45/00*     (2022.01)
    *H04L 47/2441*     (2022.01)
    *H04L 69/08*     (2022.01)

(56) References Cited

U.S. PATENT DOCUMENTS

2017/0111267 A1* 4/2017 Lin .................... H04L 47/2483
2017/0250917 A1* 8/2017 Ruckstuhl ............... H04L 45/36

FOREIGN PATENT DOCUMENTS

WO     2016041606 A1     3/2016
WO     2017188994 A1     11/2017

OTHER PUBLICATIONS

European Search Report for Application No. 19747854.8, dated Sep. 23, 2021, 19 pages.

Halpern et al., "Service Function Chaining (SFC) Architecture: draft-ieft-sfc-architecture-11", Internet-Draft: Network Working Group, Internet Engineering Task Force, IETF; Internet Society (ISOC) 4, No. 11; Jul. 24, 2015, 30 pages.

Hu et al., "A Framework for Security on Demand", 13th International Wireless Communications and Mobile Computing Conference (IWCMC), IEEE; Jun. 26-30, 2017, pp. 378-383.

Sandvine et al., "Hierarchical Service Function Chaining (hSFC): draft-ietf-sfc-hierarchical-06", Internet-Draft: Service Function Chaining, Internet Engineering Task Force, IETF; Internet Society (ISOC) 4, No. 6; Jan. 18, 2018, 26 pages.

First Examination Report for India Application No. 202047036785, dated Dec. 20, 2021, 7 pages.

* cited by examiner

| 0 | | | 7 | 15 | | | | | 23 | 31 |
|---|---|---|---|---|---|---|---|---|---|---|
| Ver | O | U | TTL | Length | U | U | U | U | MD type | Next Protocol |
| Service Path Identifier | | | | | | | | | Service Index | |
| Fixed Length Context Header 1 | | | | | | | | | | |
| Fixed Length Context Header 2 | | | | | | | | | | |
| Fixed Length Context Header 3 | | | | | | | | | | |
| Fixed Length Context Header 4 | | | | | | | | | | |

Fig. 7

| 0 | | | 7 | 15 | | | | | 23 | 31 |
|---|---|---|---|---|---|---|---|---|---|---|
| Ver | O | U | TTL | Length | IW | U | U | U | MD type | Next Protocol |
| Service Path Identifier | | | | | | | | | Service Index | |
| Interworking Flow ID & Address of SFC Interworking Agent | | | | | | | | | | |
| Metadata related to Specific Services | | | | | | | | | | |
| Fixed Length Context Header 3 | | | | | | | | | | |
| Fixed Length Context Header 4 | | | | | | | | | | |

Fig. 8

| 0 | | | 7 | | 15 | | | | | 23 | | 31 |
|---|---|---|---|---|---|---|---|---|---|---|---|---|
| Ver | O | U | TTL | | Length | IW | U | U | U | MD type | Next Protocol | |
| 35 | | | | | | | | | | | 225 | |
| IW_001:301.108.9.12 | | | | | | | | | | | | |
| Authentication: "User Name/Certificate" | | | | | | | | | | | | |
| Fixed Length Context Header 3 | | | | | | | | | | | | |
| Fixed Length Context Header 4 | | | | | | | | | | | | |

Fig. 9a

| 0 | | | 7 | | 15 | | | | | 23 | | 31 |
|---|---|---|---|---|---|---|---|---|---|---|---|---|
| Ver | O | U | TTL | | Length | U | U | U | U | MD Type | Next Protocol | |
| 86 | | | | | | | | | | | 198 | |
| IW_025:201.108.10.01 | | | | | | | | | | | | |
| Authentication: "User Name/Certificate" | | | | | | | | | | | | |
| Fixed Length Context Header 3 | | | | | | | | | | | | |
| Fixed Length Context Header 4 | | | | | | | | | | | | |

Fig. 9b

| 0 | | | 7 | | 15 | | | | | 23 | | 31 |
|---|---|---|---|---|---|---|---|---|---|---|---|---|
| Ver | O | U | TTL | | Length | U | U | U | U | MD Type | Next Protocol | |
| 86 | | | | | | | | | | | 197 | |
| IW_025:201.108.10.01 | | | | | | | | | | | | |
| Authentication: "Success/Failure" | | | | | | | | | | | | |
| Fixed Length Context Header 3 | | | | | | | | | | | | |
| Fixed Length Context Header 4 | | | | | | | | | | | | |

Fig. 9c

| Ver | O | U | TTL | Length | IW | U | U | U | MD Type | Next Protocol |
|---|---|---|---|---|---|---|---|---|---|---|
| | | | | 35 | | | | | | 224 |
| IW_001:301.108.9.12 ||||||||||||
| Authentication: "Success/Failure" ||||||||||||
| Fixed Length Context Header 3 ||||||||||||
| Fixed Length Context Header 4 ||||||||||||

Fig. 9d

| Ver | O | U | TTL | Length | U | U | U | U | MD Type | Next Protocol |
|---|---|---|---|---|---|---|---|---|---|---|
| | | | | 35 | | | | | | 223 |
| Fixed Length Context Header 1 ||||||||||||
| Authentication: "Success/Failure" ||||||||||||
| Fixed Length Context Header 3 ||||||||||||
| Fixed Length Context Header 4 ||||||||||||

Fig. 9e

| Ver | O | U | TTL | Length | IW | U | U | U | MD Type | Next Protocol |
|---|---|---|---|---|---|---|---|---|---|---|
| | | | | 37 | | | | | | 213 |
| IW_002:301.108.9.12 ||||||||||||
| Filtering Rule: "Virus Name" ||||||||||||
| Fixed Length Context Header 3 ||||||||||||
| Fixed Length Context Header 4 ||||||||||||

Fig. 10a

| Ver | O | U | TTL | Length | U | U | U | U | MD Type | Next Protocol |
|-----|---|---|-----|--------|---|---|---|---|---------|---------------|
| 87 ||||||||||  189 |
| IW_026:201.108.10.1 ||||||||||  |
| Filtering Rule: "Virus Name" ||||||||||  |
| Fixed Length Context Header 3 ||||||||||  |
| Fixed Length Context Header 4 ||||||||||  |

Fig. 10b

| Ver | O | U | TTL | Length | U | U | U | U | MD Type | Next Protocol |
|-----|---|---|-----|--------|---|---|---|---|---------|---------------|
| 87 ||||||||||  188 |
| IW_026:201.108.10.1 ||||||||||  |
| No Virus ||||||||||  |
| Fixed Length Context Header 3 ||||||||||  |
| Fixed Length Context Header 4 ||||||||||  |

Fig. 10c

| Ver | O | U | TTL | Length | U | U | U | U | MD Type | Next Protocol |
|-----|---|---|-----|--------|---|---|---|---|---------|---------------|
| 87 ||||||||||  188 |
| IW_026:201.108.10.1 ||||||||||  |
| Virus Removed ||||||||||  |
| Fixed Length Context Header 3 ||||||||||  |
| Fixed Length Context Header 4 ||||||||||  |

Fig. 10d

| Ver | O | U | TTL | Length | IW | U | U | U | MD Type | Next Protocol |
|---|---|---|---|---|---|---|---|---|---|---|
| | | | | 37 | | | | | | 212 |
| IW_002:301.108.9.12 ||||||||||||
| No Virus/Virus Removed ||||||||||||
| Fixed Length Context Header 3 ||||||||||||
| Fixed Length Context Header 4 ||||||||||||

Fig. 10e

| Ver | O | U | TTL | Length | U | U | U | U | MD Type | Next Protocol |
|---|---|---|---|---|---|---|---|---|---|---|
| | | | | 37 | | | | | | 211 |
| Fixed Length Context Header 1 ||||||||||||
| No Virus/Virus Removed ||||||||||||
| Fixed Length Context Header 3 ||||||||||||
| Fixed Length Context Header 4 ||||||||||||

Fig. 10f

METHOD AND DEVICE FOR INTERWORKING BETWEEN SERVICE FUNCTION CHAIN DOMAINS

CROSS-REFERENCE TO RELATED APPLICATIONS

This application is a national stage entry of International Application No. PCT/CN2019/074450, filed Feb. 1, 2019, entitled "METHOD AND DEVICE FOR INTERWORKING BETWEEN SERVICE FUNCTION CHAIN DOMAINS" which claims the benefit of priority of Chinese Application No. 201810101927.2, filed Feb. 1, 2018, both of which are hereby incorporated by reference in their entireties.

FIELD

Embodiments of the present disclosure generally relate to the field of network, and more specifically, to method, device and computer-readable storage medium for interworking between service function chain (i.e., service chain) domains.

BACKGROUND

As technologies such as Network Function Virtualization (NFV), Software-Defined Network (SDN) and Service Function Chain (SFC) emerge, network operators can transform the network to make the network programmable and lower the costs. Accordingly, various applications can be rapidly and conveniently deployed based on these technologies.

To defend rapidly growing and evolutionary attacks (e.g., malware, Distributed Denial of Service and false identities etc.), it is required to dynamically, flexibly and adaptively provide personalized security services or functions for applications with distinct security requirements. However, the traditional security facilities (such as firewall, invasion detection system, deep packet inspection and the like) are implemented based on the middleware of the hardware and deployed at fixed locations in the network. Therefore, the traditional security facilities can hardly satisfy various security requirements of the applications based on the above technologies.

The security services may be deployed in different domains, but the existing service chain technology cannot support the service chain across different domains. Hence, a solution for supporting interworking between a plurality of domains managed and operated by various service providers is required.

SUMMARY

A brief summary of the respective embodiments is provided below to offer basic understanding of some aspects of the embodiments. It is noted that the Summary is not intended for identifying main points of the key elements or describing the scope of the respective embodiments. The sole purpose of the Summary is to display some concepts in a simplified manner to act as preceding contents for the subsequent details.

In accordance with some embodiments, there is provided a communication method. The method comprises: receiving, at a first logic node of a first service chain in a first domain, a first packet associated with a second service chain in a second domain; converting the first packet into a second packet, the second packet comprising first interworking information between the first service chain and the second service chain, the first interworking information comprising a flag indicating that the second packet is an interworking packet, a first service path identifier of the second packet, an address of the first logic node, a first flow identifier of the second packet and metadata associated with the second service chain; transmitting the second packet to a second logic node in the second domain; and receiving from the second logic node a response to the metadata.

In accordance with some embodiments, there is provided a communication method. The method comprises: at a second logic node in a second domain, in response to determining that a received second packet is an interworking packet, obtaining, from the second packet, metadata associated with a second service chain in the second domain; converting the second packet into a fifth packet, the fifth packet comprising a flag indicating that the fifth packet is a non-interworking packet, a second flow identifier within the second domain, a second service path identifier within the second domain, an address of the second logic node and metadata associated with the second service chain; forwarding the fifth packet to a fourth logic node within the second service chain; and receiving a sixth packet from a fifth logic node within the second service chain, the sixth packet comprising the second flow identifier, the second service path identifier and a response to the metadata.

In accordance with embodiments, there is provided a device for interworking between service function chain domains. The device comprises: a processor; and a memory having instructions stored therein which, when executed by the processor, cause the device to: receive, at a first logic node of a first service chain in a first domain, a first packet associated with a second service chain in a second domain; convert the first packet into a second packet, the second packet comprising first interworking information between the first service chain and the second service chain, the first interworking information comprising a flag indicating that the second packet is an interworking packet, a first service path identifier of the second packet, an address of the first logic node, a first flow identifier of the second packet and metadata associated with the second service chain; transmit the second packet to a second logic node in the second domain; and receive from the second logic node a response to the metadata.

In accordance with embodiments, there is provided a device for interworking between service function chain domains. The device comprises: a processor; and a memory having instructions stored therein which, when executed by the processor, cause the device to: at a second logic node in a second domain, in response to determining that a received second packet is an interworking packet, obtain, from the second packet, metadata associated with a second service chain in the second domain; convert the second packet into a fifth packet, the fifth packet comprising a flag indicating that the fifth packet is a non-interworking packet, a second flow identifier within the second domain, the second service path identifier, an address of the second logic node and metadata associated with the second service chain; forward the fifth packet to a fourth logic node within the second service chain; and receive a sixth packet from a fifth logic node within the second service chain, the sixth packet comprising the second service path identifier, the second flow identifier and a response to the metadata.

In accordance with some embodiments, there is provided a computer-readable storage medium having computer programs stored therein, the programs, when executed by a processor, implementing a method. The method comprises: receiving, at a first logic node of a first service chain in a first domain, a first packet associated with a second service chain in a second domain; converting the first packet into a second packet, the second packet comprising first interworking information between the first service chain and the second service chain, the first interworking information comprising a flag indicating that the second packet is an interworking packet, a first service path identifier of the second packet, an address of the first logic node, a first flow identifier of the second packet and metadata associated with the second service chain; transmitting the second packet to a second logic node in the second domain; and receiving from the second logic node a response to the metadata.

In accordance with some embodiments, there is provided a computer-readable storage medium having computer programs stored therein, the programs when executed by a processor implementing a method. The method comprises: at a second logic node in a second domain, in response to determining that a received second packet is an interworking packet, obtaining, from the second packet, metadata associated with a second service chain in the second domain; converting the second packet into a fifth packet, the fifth packet comprising a flag indicating that the fifth packet is a non-interworking packet, a second flow identifier within the second domain, a second service path identifier within the second domain, an address of the second logic node and metadata associated with the second service chain; forwarding the fifth packet to a fourth logic node within the second service chain; and receiving a sixth packet from a fifth logic node within the second service chain, the sixth packet comprising the second flow identifier, the second service path identifier and a response to the metadata.

It should be appreciated that the contents described in the Summary are not intended to define key or essential features of the embodiments of the present disclosure, or limit the scope of the present disclosure. Other features of the present disclosure will be understood more easily through the following description.

BRIEF DESCRIPTION OF THE DRAWINGS

Objectives, advantages and other features of the present disclosure will become more apparent through the following disclosure and claims. For the purpose of examples only, non-restrictive description of the preferred embodiments are provided with reference to the drawings, in which:

FIG. 7 illustrates a schematic diagram of a network service header according to the prior art;

FIG. 8 illustrates a schematic diagram of an extended network service header in accordance with embodiments of the present disclosure;

FIGS. 9a-9e illustrate a schematic diagram of network service header at a plurality of nodes in the embodiment shown in FIG. 5;

FIGS. 10a-10f illustrate a schematic diagram of network service header at a plurality of nodes in the embodiment shown in FIG. 6;

In the drawings, same or corresponding reference signs indicate same or corresponding parts.

DETAILED DESCRIPTION OF EMBODIMENTS

Many details are described in the following description for the purpose of explanation. However, those ordinary skilled in the art will recognize that embodiments of the present disclosure may be implemented without utilizing the specific details. Therefore, the present disclosure is not restricted by the illustrated embodiments. Instead, the present disclosure is given a broadest scope in consistency with principles and features described herein.

It should be understood that the terms "first," "second" and the like are used for distinguishing one element from another element only. However, the first element, in fact, may also be referred to as second element and vice versa. Moreover, it should also be understood that "comprise" and "comprising" are only for explaining presence of stated features, elements, functions or components without excluding the presence of one or more other features, elements, functions or components.

Standard [b-IETF RFC 7665] defines that Service Function Chain (SFC) comprises Security Service Chain (SSC). The SSC defines an ordered set of security functions and security policies which may be applied to packets and/or flows selected as a result of classification. SSC enables security service providers to manage and operate stand-alone security services and provide customized security services which may be integrated into other services (such as Intelligent Transport System (ITS), video service and location service). In this way, the service providers (e.g., ITS service provider, video service provider, location service provider etc.) may mainly focus on their own basic service logics and obtain professional security services from security service providers to provide to the end users.

Figure 1:
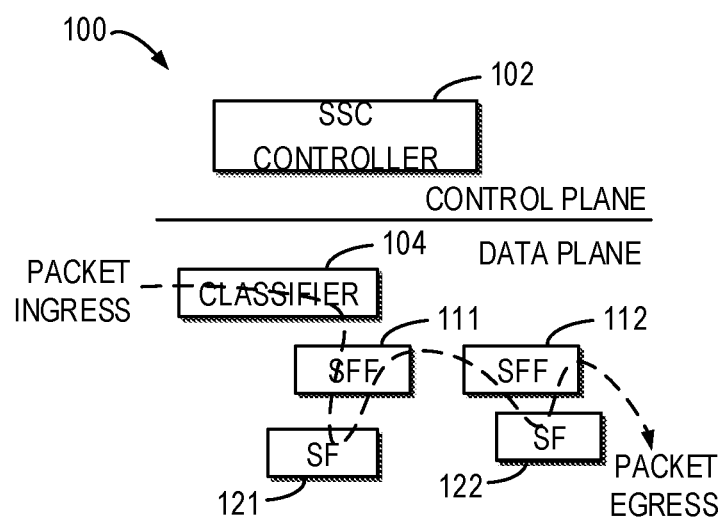
FIG. 1 illustrates an exemplary architecture of a system for providing security services in accordance with embodiments of the present disclosure.

FIG. 1 illustrates a schematic architecture of a system 100 for providing security service in accordance with embodiments of the present disclosure. The system 100 may comprise one or more controllers, which may be distributed over one or more physical hosts and/or virtual hosts. For example, as shown in FIG. 1, the system 100 may comprise a Security Service Chain (SSC) controller 102. It should be understood that the architecture of system 100 shown in FIG. 1 is only exemplary and is not intended to restrict functions and scope of the embodiments of the present disclosure.

As shown in FIG. 1, the SSC controller 102 may communicate with various nodes in a data plane and configure these nodes in the data plane. For example, the data plane may comprise a classifier 104, Security Service Forwarders (SFF) 111 and 112 and corresponding Service Functions (SF) 121 and 122. FIG. 1 also illustrates an exemplary security service chain and its path is: Classifier 104→SFF 111→SF 121→SFF 111→SFF 112→SF 122. The system 100 is an independent SSC, which may allow the security service providers to manage and operate stand-alone security service on their own.

Figure 2:
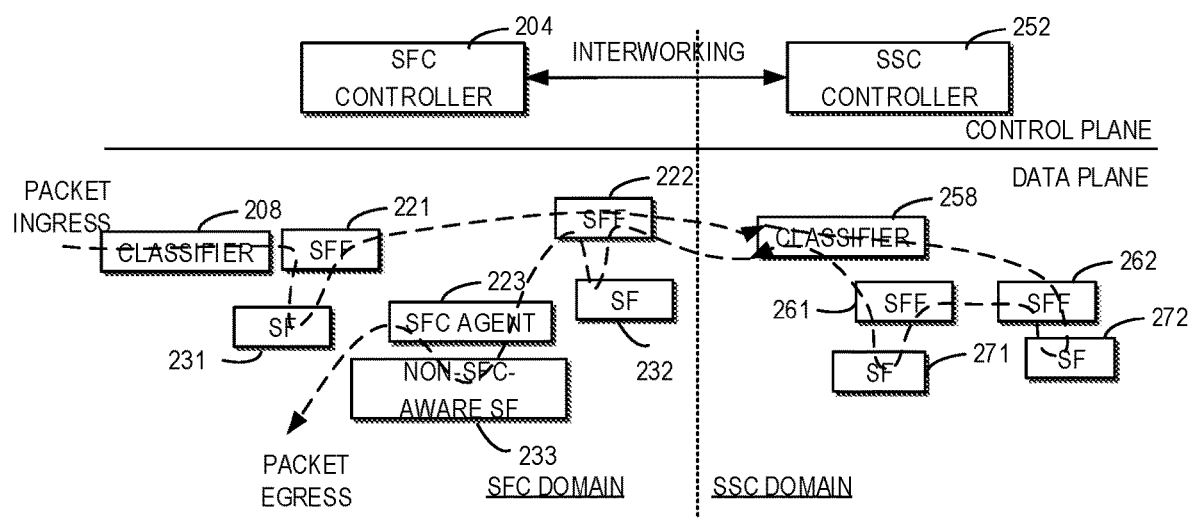
FIG. 2 illustrates another exemplary architecture of a system for providing security services in accordance with embodiments of the present disclosure.

FIG. 2 illustrates a schematic architecture diagram of a system 200 for providing security services in accordance with an embodiment of the present disclosure. In system 200, the SFC domain and the SSC domain interwork with each other to provide end-to-end services/applications. For example, the SFC domain comprises a first service chain and the SSC domain contains a second service chain, which is integrated into the first service chain to provide end-to-end services/applications. It should be understood that although FIG. 2 only illustrates two different domains, the system 200 may further comprise more domains and the present disclosure is not limited in this regard.

In the example of FIG. 2, the SFC domain and the SSC domain interwork with each other to provide end-to-end services/applications. For example, an integrated service chain path may be: Classifier 208→SFF 221→SF 231→SFF 221→SFF 222→Classifier 258→SFF 262→SF 272→SFF 262→SFF 261→SF 271→SFF 261→Classifier 258→SFF 222→SF 232→SFC Agent 223→non-SFC-aware SF→SFC Agent 223.

There are two types of security service chains. One type is non-user-oriented SSC, which is neither specific to users, nor specific to service logics. The non-user-oriented SSC may provide a variety of security services, comprising packet filtering, invasion detection and protection and traffic cleaning through security devices (such as firewall, Invasion Detection System (IDS) and Invasion Protection System (IPS)). The other type is user-oriented SSC, which is specific to user and/or particular service logics and is integrated into the SFC in a specific order by cooperating with the SFC controller. For example, before accessing the service, the end users must be authenticated and authorized. The user-oriented SSC provides security services (e.g., authentication, authorization and encryption/decryption for each user and the like) to realize protection at a higher level. The stand-alone SSC shown in FIG. 1 may be applied to non-user-oriented SSC and the interworking SSC illustrated in FIG. 2 may be applied to both the stand-alone SSC shown in FIG. 1 and the interworking SSC shown in FIG. 2.

Delivery of end-to-end services/applications generally requires various service functions, which may be implemented in the host and managed and operated by different management organizations or service providers. These hosts may be located in a geographically dispersed network. In addition, a third trusted party (e.g., security service provider) provides, for example, authentication of end-to-end services/applications and security protection of packet filtering. Therefore, it is necessary to support interworking between the SSC and other SFC.

Figure 3:
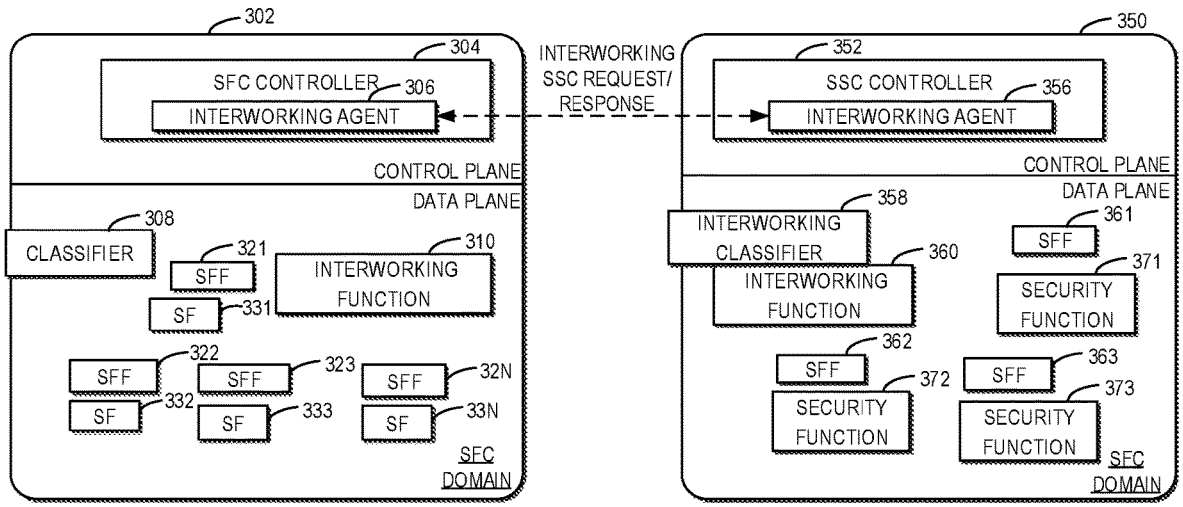
FIG. 3 illustrates an exemplary block diagram of a system for providing security services in accordance with embodiments of the present disclosure.

FIG. 3 illustrates an architecture which supports interworking between the SFC and the SSC in accordance with an embodiment of the present disclosure. As shown in FIG. 3, some of the logic functions have the same definitions as those in [b-IETF RFC 7665]. For example, these logic functions may be a classifier (e.g., classifier 308) of the SFC domain 302, SFF (such as SFF 321-32N and SFF 361-363) and SF (e.g., SF 331-33N and security functions 371-373).

In some embodiments, in order to support interworking between the SSC and the SFC, two new logic functions (i.e., interworking agents 306 and 356 and interworking functions 310 and 360) may be configured, and the classifier within the SSC domain 350 also may be extended (e.g., interworking classifier 358).

As shown in FIG. 3, the interworking agents 306 and 356 may be implemented in the SSC controller 304 and the SFC controller 352, respectively. In some embodiments, the interworking agent 306 or 356 may determine whether the delivery of the end-to-end services/applications requires interworking between the service function chain and the SFC in other domains.

In some embodiments, the interworking agent 306 or 356 may manage registration of SFC domains to be interworked therewith. For example, the interworking agent 306 of the SFC controller 304 may manage the registration of the SSC domain 350. The registration information comprises, but not limited to, an identifier of the SFC domain 302, a domain name of the SFC domain 302, an address (e.g., IP address) and a port of the SFC controller 304, functionality description of the SFC domain 302 and the like. Moreover, it should be appreciated that since the SSC is a type of SFC, the interworking agent 356 of the SSC controller 352 also may be configured in a similar way. It should be understood that although the interworking between SFC and SSC is illustrated here, interworking between any other suitable types of SFCs may also be implemented in a similar way and the present disclosure is not limited in this regard. For the sake of simplicity, the description is now provided with respect to the SFC domain 302 as an example. It should be understood that the following descriptions are also applicable to the SSC domain 350.

In some embodiments, the interworking agent 306 may manage registration of the SFC catalog and interaction with other SFC domains. The registration information comprises, but not limited to, an identifier of the SFC domain, an identifier of the SFC, a name of the SFC, a service function of the SFC, functionality description of the SFC and interworking function to be linked etc.

In some embodiments, the interworking agent 306 may establish integrated or combined service chain (or combined Service Forwarding Path SFP), which may traverse different SFC domains. For example, different SFC domains may be deployed at the same geographical location, but managed by different service providers. Alternatively, different SFC domains also may be deployed at different geographical locations and managed by different service providers. For example, the SFC controller 304 may combine the service chain in the SFC domain 302 with the security service chain in the SSC domain 350, which may be implemented via the interworking function.

In some embodiments, the interworking agent 306 may update, together with the SFC catalog, the registration information of the SFC controller with which the interworking agent 306 is interacting. Two possible mechanisms may be employed to update the registration information, i.e., actively obtaining the update and being pushed with the update. For example, the SFC controller 304 may periodically obtain from the SSC domain 350 the updated registration information of the SSC catalog. Of course, the SSC controller 352 in the SSC domain 350 may report its registration state together with the SSC catalog to the SFC controller 304 in case of an update.

In some embodiments, the interworking agent 306 may configure the interworking function to discover the SFC domain interacting therewith. For example, the SFC controller 304 may configure the interworking function 310 to discover the SSC domain 350.

In some embodiments, the interworking agent 306 may construct the general SFP defined in [b-IETF RFC 7665] and the interworking SFP defined herein. For example, the SSC controller 352 in the SSC domain 350 may construct the interworking SFP and configure the interworking classifier 358 to support the interworking between the SSC and the SFC.

In order to facilitate the description of the interworking function 310, Networking Servicer Header (NSH) and extension thereof are firstly introduced with reference to FIGS. 7 and 8. For the sake of simplicity, the NSH, as defined in [b-IETF draft-ietf-sfc-nsh], which is shown in FIG. 7 will be referred to as "general NSH" and the packet having the general NSH will be referred to as general packet or non-interworking packet. The NSH shown in FIG. 8 will be referred to as "interworking NSH" and the packet having the interworking NSH will be referred to as "interworking packet."

To simplify the description, FIG. 8 is explained by taking the NSH with MD type=0x1 (i.e., Fixed Length Context Header) as an example. The example of FIG. 8 also may be applied to the NSH with MD type=0x2 (i.e., Variable Length Context Header). Moreover, some security aspects irrelevant to the SFC function defined herein are omitted, for example, how to provide confidentiality and integrity for the NSH during transmission between the SFC domains or even within one SFC domain and how to encapsulate the extended NSH etc.

FIG. 7 illustrates IETF SFC NSH with MD type=0x1 (i.e., Fixed Length Context Header) defined in [IETF draft-ietf-sfc-nsh]. As shown in FIG. 7, the base header of the NSH comprises 5 unassigned bits, which are marked as "U." Any one of the five unassigned bits may be used to indicate whether this NSH is a general NSH or an interworking NSH defined herein. For example, the second unassigned bit may be used to indicate that the NSH is an interworking NSH and be marked as "IW" as shown in FIG. 8. If the flag field "IW" is set to "1," it means that the NSH is an interworking NSH. If the flag field "IW" is set to "0," it means that the NSH is not an interworking NSH.

The general NSH has four Fixed Length Context Headers, one or more of which may be used to support the interworking between the SFC and the SSC. For example, as shown in FIG. 8, the flag field IW of the interworking NSH indicates whether the packet is an interworking packet or a general packet, and the Fixed Length Context Header 1 and the Fixed Length Context Header 2 may comprise related metadata. For example, the Fixed Length Context Header 1 may comprise a flow identifier and an address (e.g., IP address) of the SFC interworking function. The address may indicate flows/packets to be transmitted back to the SFC interworking function when the interworking SFC is completed. The Fixed Length Context Header 2 may comprise metadata associated with a specific service (e.g., security service, payment service and the like).

In some embodiments, the interworking function 310 may support the discovery of the SFC domain to be interworked therewith. For example, the interworking function 310 may discover the SSC domain 350 supporting the security service and the interworking function 360 may discover the SFC domain 302. For the sake of simplicity, the related registration and discovery mechanism will not be discussed herein.

In some embodiments, the interworking function 310 may support the interworking NSH, convert the general NSH into the interworking NSH and convert the interworking NSH into the general NSH. In some embodiments, the interworking functions 310 and 360 manage the mapping of the interworking SFC between two SFC domains. In some embodiments, the interworking functions 310 and 360 may have the function of SFF.

The interworking classifier 358 may support the functions defined in [b-IETF RFC 7665]. In some embodiments, the interworking classifier 358 may determine, according to the flag field "IW" of the interworking NSH, whether the packet is an interworking SFC or a general SFC.

In some embodiments, the interworking classifier 358 may manage the general SFP and the interworking SFP. In some embodiments, the interworking classifier 358 may respond to the interworking function of transmitting the SFC interworking request. For example, the interworking function 310 of the SFC domain transmits to the SSC domain of the security service a request for the SFC interworking. When the security service is provided in the SSC domain, the interworking classifier 358 in the SSC domain should forward the response to the interworking function 310 in the SFC domain.

As shown in FIG. 3, the interworking classifier 358 and the interworking function 360 may be deployed in the same host for the sake of simplicity. The interworking process is now described with reference to FIG. 3. In the example, the end-to-end services/applications require the interaction between the SFC and the SSC to obtain the security protection.

When the SFC request is received from the service/application, the SFC controller 304 creates a service chain (e.g., SFC1) comprising the SSC request for interworking with the SSC domain 350. Then, the related classification policies are reflected into the classifier 308 and the related SFP forwarding policies are reflected into the SFF 321-32N and the corresponding interworking function 310 of the SFC domain 302. The SFC controller 304 may utilize various already known or to be developed methods to create the service chain SFC1.

In the SFC domain 302, one flow/packet passes through the classifier 308 and the corresponding SFF and finally reaches the interworking function 310. After receiving the flow/packet, the interworking function 310 constructs the interworking NSH as shown in FIG. 8 and stores mapping information of the service chain SFC1 interworking with the SSC domain 350. The mapping information may comprise, but not limited to: an interworking flow ID in the SFC domain 302, a Service Path Identifier (SPI) and a Service Index (SI) in the SFC domain, an SSC domain ID, IP addresses of the interworking classifier 2 and the interworking function 2 in the SSC domain and metadata in the Fixed Length Context Headers 1 and 2. Then, the interworking function 310 forwards the flow/packet having the interworking NSH to the interworking classifier 358 and the interworking function 360 of the SSC domain. As shown in FIG. 3, the interworking classifier 358 and the interworking function 360 may be deployed on the same host.

When the packet/flow of the interworking NSH is received from the interworking function 310 of the SSC domain 302, the interworking classifier 358 in the SSC domain recognizes that it is an interworking SSC request and selects corresponding interworking security service chains (e.g., SSC_1) based on the metadata in the Fixed Length Context Header 2 as shown in FIG. 8. If the interworking classifier 358 discovers that the flow/packet lacks suitable or active interworking SSC, the interworking classifier 358 communicates with the SSC controller 352 to create the interworking SSC.

The interworking function 360 in the SSC domain 350 stores the mapping information of the interworking between the SSC and the SFC, e.g., an interworking flow ID in the SSC domain 350, SPI and SI in the SSC domain 350, an SFC domain ID, an interworking flow ID in the SFC domain, SPI&SI in the SFC domain, an IP address, an interworking function 310 in the SFC domain and metadata in the Fixed Length Context Headers 1 and 2, etc. The interworking NSH is converted into the general NSH and the metadata in the Fixed Length Context Header 1 and/or 2 will be maintained.

The interworking classifier 358 forwards, according to the corresponding SFP, the flow/packet and the general NSH to a next hop in the SSC domain. The packet/flow of the general NSH passes through the security function and the SFF required by the SSC domain 350 and then is returned back to the interworking classifier 358 according to the SFP.

When a flow/packet having the general NSH is received in the SSC domain 350 from the SFF, the interworking classifier 358 recognizes that it is an interworking SSC. The interworking function 360 searches the mapping information and discovers that the next hop for the SSC is the interworking function 310 in the SFC domain. The interworking function 360 coverts the general NSH into the interworking NSH.

The interworking classifier 358 forwards the flow/packet and the interworking NSH to the interworking function 310 in the SFC domain 302. The interworking function 310 in the SFC domain 302 converts the interworking NSH into the general NSH and forwards the general NSH to a next hop of the service chain SFC1 in the SFC domain. By this time, the interworking between the SFC and the SSC is completed.

Example methods in accordance with embodiments of the present disclosure are described now in connection with a particular scenario of Special Vehicle (SV) speedup. However, it should be understood that this is only for the purpose of description. Embodiments of the present disclosure also may be applied to other scenarios of Internet of Things and the scope of the present disclosure is not limited in this regard.

Public safety and disaster rescue service (e.g., emergent medical service, firefighting and antiterrorism) are more and more important in the current society. However, such special vehicles such as ambulances, fire engines and police cars may also suffer from the traffic congestions, which delay the delivery of rescue services or public safety services to the citizens. Therefore, it is necessary to provide the SV speedup service to improve the traffic efficiency and safety.

Figure 4:
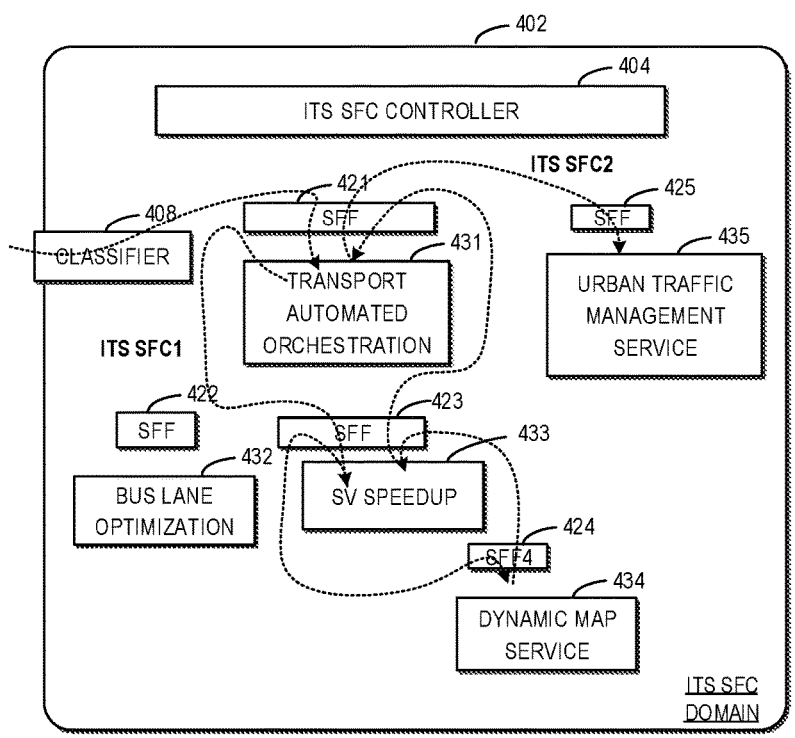
FIG. 4 illustrates a schematic block diagram of a system for providing intelligent transport services in accordance with embodiments of the present disclosure.

FIG. 4 illustrates a possible SFC (known as ITS SFC1), which illustrates how to provide the SV speedup service: Classifier 408→SFF 421→Transport Automated Orchestration 431→SFF 421→SFF 423→SV Speedup 433→SFF 423→SFF 424→Dynamic Map Service 434→SFF 424→SFF 423→SV Speedup 433→SFF 423→SFF 421→Transport Automated Orchestration 431. Moreover, FIG. 4 also illustrates SFF 422 and Bus Lane Optimization 432, but the details are not provided for the sake of simplicity.

When a special vehicle is on duty, ITS terminal of the special vehicle transmits a speedup request to the classifier 408. The classifier 408 selects the Service Forwarding Path (SFP) and forwards the request to Transport Automated Orchestration 431, which in turn forwards the request to the SV Speedup 433. The SV Speedup 433 transmits a routing request to Dynamic Map Service 434. The Dynamic Map Service 434 generates several route options comprising the identifiers of road and lane based on the static map and the state of Road Side Unit (RSU, e.g., traffic lights and speedometer) and then transmits a corresponding response to the SV Speedup 443. The SV Speedup 443 selects the best route from the route options according to a criterion (e.g., congestion and distance) and notifies the Transport Automated Orchestration 431 to broadcast a speedup preemption message (road ID & lane ID to be preempted) to other vehicles equipped with ITS terminals. After receiving this preemption message, a general vehicle checks its current location and gives up the lane if it is travelling on the preempted lane. Then, the special vehicle may use the preempted lane. Once the special vehicle arrives at the destination, the ITS terminal of the special vehicle may transmit speedup release information to the SV Speedup 433 to release the preempted lane.

FIG. 4 also illustrates another possible SFC (known as ITS SFC2), which supports the ITS service to notify Urban Traffic Management Service to control the traffic lights. The path of the SFC is provided as below: Transport Automated Orchestration 431→SFF 421→SFF 425→Urban Traffic Management Service 435. The Transport Automated Orchestration 431 continually checks congestion state in a route. If the congestion is heavy, a speedup RSU command is sent to Urban Traffic Management Service 435 to control the traffic lights to be green or reduce the time of red light to relieve the congestion in the route.

As described above, in order to provide the speedup service for special vehicles, ITS SFC1 and/or ITS SFC2 as shown in FIG. 4 may be created. Moreover, the Urban Traffic Management Service may also be deployed in different SFC domains managed by the City Traffic Police Department. Accordingly, the interworking may also be required between the ITS SFC domain and a further SFC domain managing the Urban Traffic Management Service. However, to simplify the description, it is assumed here that the Urban Traffic Management Service is also deployed in the ITS SFC domain.

The SV speedup service is an Intelligent Transport Service (ITS). There may be an attacker who impersonates a legal user to access the SV speedup service. Moreover, the request also may be injected with virus or malware and sent to the Urban Traffic Management Service to control the traffic lights. Accordingly, the security policy for the ITS service may be executed, such as authentication of users and ITS terminals, attack detection and traffic cleaning of the requests for the Urban Traffic Management Service.

In order to explain the interworking between the SSC and the SFC, it is assumed that the ITS SFC domain and the SSC domain are managed by different service providers. Moreover, the SSC domain may interwork with other SFC domains than the SFC domain. It is also assumed that the underlying network of the two SFC domains may support the SFC.

Figure 5:
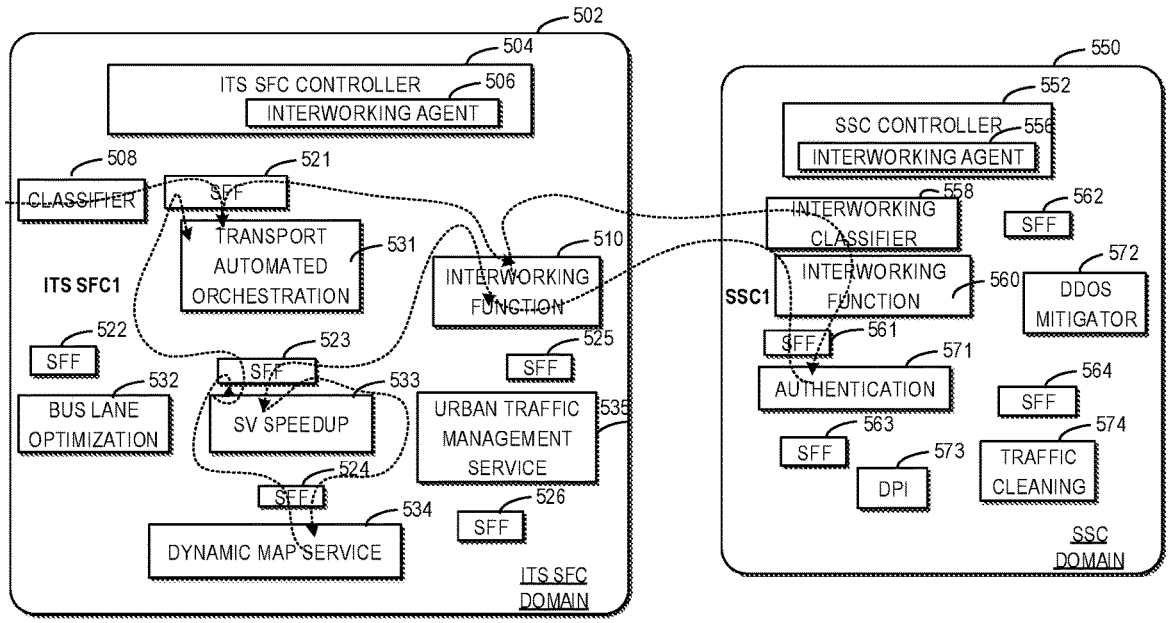
FIG. 5 illustrates an exemplary block diagram of a system for providing security services to intelligent transport service in accordance with embodiments of the present disclosure.

FIG. 5 illustrates a schematic diagram of authentication in the SV speedup service in accordance with an embodiment of the present disclosure. In order to mitigate/prevent such attacks, the users are authenticated before accessing the SV speedup service. To describe how the SSC domain interworks with the SFC domain, it is assumed that the authentication service is provided by a trusted third party (e.g., government, public safety department etc.).

As shown in FIG. 5, the SFC1 within the ITS SFC domain may be combined with the SSC1 within the SSC domain to provide authentication. The path with the combination is: Classifier 508→SFF 521→Transport Automated Orchestration 531→SFF 521→Interworking Function 510→Interworking Classifier 558 and Interworking Function 560→SFF 561→Authentication 571→SFF 561→Interworking Classifier 558 and Interworking Function 560→Interworking Function 510→SFF 523→SV Speedup 553→SFF 523→SFF 524→Dynamic Map Service 534→SFF 524→SFF 523→SV Speedup 533→SFF 523→SFF 521→Transport Automated Orchestration 531.

Moreover, FIG. 5 further illustrates SFF 522, Bus Lane Optimization 532, SFF 562 and Distributed Denial of Service (DDoS) mitigator 572. These modules are not described in details for the sake of simplicity.

In some embodiments, the SFC domain identifier of the ITS SFC domain may be set to SFC_D001 and the SFC domain identifier of the SSC domain may be set to SFC_D002. In addition, the interworking classifier 558 and the interworking function 560 may be deployed in the same host for the sake of simplicity.

In some embodiments, the interworking agent 506 in the ITS SFC controller 504 may manage the registration of the SSC domain as shown in Table 1:

TABLE 1

| SFC Domain ID | SFC Domain Name | IP Address | Description |
|---|---|---|---|
| SFC_D002 | SSC Domain | 192.168.0.1 | Secure |

According to security requirements of ITS, the interworking agent 506 in the ITS SFC controller 504 may manage the logic SSC of the SSC controller 552 as shown in Table 2. For example, in one embodiment, the ITS service may require two logic SSCs, being SSC1 (authentication) and SSC2 (Deep Packet Inspection (DPI)→Traffic Cleaning) respectively.

TABLE 2

| SFC Domain ID | SFC ID | SFC Name | Functionality | SF for SFC | Via SFC Interworking Function |
|---|---|---|---|---|---|
| SFC_D002 | SFC_SSC001 | SSC1: User Authentication | Authentication | Authentication | SFC Interworking Function 510 |
| SFC_D002 | SFC_SSC002 | SSC2: Virus/Malware Detection and Cleaning | Attack Detection and Traffic Cleaning | DPI-> Traffic Cleaning | SFC Interworking Function 510 |

The interworking agent 506 in the ITS SFC controller 504 configures the interworking function 510 to support the interworking between the SFC domain 502 and the SSC domain 550. The interworking function 510 manages the mapping of the SFC interaction information as shown in Tables 3 and 4.

TABLE 3

| Interworking Flow ID | SPI | SI | Context Header 1 (Interworking Flow ID and Address of SFC Interworking Agent) | Context Header 2 (Security-related Metadata) | Context Header 3 | Context Header 4 | SFC ID Responding to SFC Interworking | Address of SFC Interworking Function 560 |
|---|---|---|---|---|---|---|---|---|
| IW_001 | 35 | 225 | IW_001:301.108.9.12 | Authentication: "User Name/ Certificate" | — | — | SFC_D002: SFC_SSC001 | 201.108.10.1 |
| IW_002 | 37 | 213 | IW_002:301.108.9.12 | Filtering Rule: "Virus" Name | — | — | SFC_D002: SFC_SSC002 | 201.108.10.1 |

TABLE 4

| Interworking Flow ID | SPI | SI | Context Header 1 (Interworking Flow ID and Address of SFC Interworking Agent) | Context Header 2 (Security-related Metadata) | Context Header 3 | Context Header 4 | Address of SFC Interworking Function 510 |
|---|---|---|---|---|---|---|---|
| IW_025 | 86 | 198 | IW_025:201.108.10.1 | Success/Failure | — | — | 301.108.9.12 |
| IW_026 | 87 | 189 | IW_026:201.108.10.1 | No Virus/Virus Removed | — | — | 301.108.9.12 |

As for the interworking of the update of registration information for SFC domains with SSC, the interworking agent 506 in the ITS SFC controller 504 may periodically obtain updated registration information from the SSC domain 550, or the interworking agent 556 in the SSC controller 552 reports its registration state when there is any update. Consequently, the above Table 1 will be updated correspondingly.

A procedure of the interworking between the ITS SFC domain 502 and the SSC domain 550 will be described below with reference to FIG. 5. The interworking function 510, when receiving the packet/flow from the Transport Automated Orchestration 531, constructs the interworking NSH as shown in FIG. 9a. It should be understood that values of other fields irrelevant to the SFC interworking are not illustrated here. As shown in FIG. 9a, the interworking NSH comprises a flag (IW) indicating that the packet is an interworking packet, a flow identifier (IW_001), an IP address (301.108.9.12) of the interworking function 510 and metadata associated with Security Service Chain (SSC1).

The interworking function 510 may store the mapping information as shown in Table 3 and forward the packet/flow with the interworking NSH to the interworking classifier 558 and the interworking function 560.

The interworking classifier 558 selects the SSC1 based on the metadata of the Context Header 2 within the packet/flow and simultaneously indicates the authentication 571 to return the packet/flow back to the interworking classifier 558 and the interworking function 560. The interworking function 560 converts the interworking NSH into the general NSH as shown in FIG. 9b. The general NSH comprises a flag (U) indicating that the packet is a general packet, a flow identifier (IW_025), an IP address (201.108.10.1) of the interworking classifier 580 and the interworking function 560, and metadata associated with the Security Service Chain (SSC1).

The interworking classifier 558 and the interworking function 560 may store the mapping information as shown in Table 4 and forward the packet/flow with the general NSH to the authentication 571.

The authentication 571 authenticates the users via the "authentication: user name/certificate" in the Fixed Length Context Header 2. Then, the field "Fixed Length Context Header 2" is updated using "authentication: success/failure." The updated NSH is shown in FIG. 9c. The general NSH comprises a flag (U) indicating that the packet is a general packet, a flow identifier (IW_025), an IP address (201.108.10.1) of the interworking classifier 580 and the interworking function 560 and a response to the metadata.

The authentication 571 may determine, by checking the field of the Fixed Length Context Header 1, the addresses of the interworking classifier 558 and the interworking function 560, and then forward the packet/flow to the interworking classifier 558 and the interworking function 560. The classifier 558 and the interworking function 560 may convert the general NSH into the interworking NSH as shown in FIG. 9d. The interworking NSH comprises a flag (IW) indicating that the packet is an interworking packet, a flow identifier (IW_001), an IP address (301.108.9.12) of the interworking function 510 and a response to the metadata.

The interworking classifier 558 and the interworking function 560 forward the packet/flow with the interworking NSH to the interworking function 510, which converts the interworking NSH into the general NSH as shown in FIG. 9e. The general NSH comprises a flag (U) indicating that the packet is a general packet and a response to the metadata.

The interworking function 510 forwards, via the SFF 523, the packet/flow with the interworking NSH to the SV speedup 533. The subsequent operations are similar to those as shown in FIG. 4 and will not be repeated here.

Figure 6:
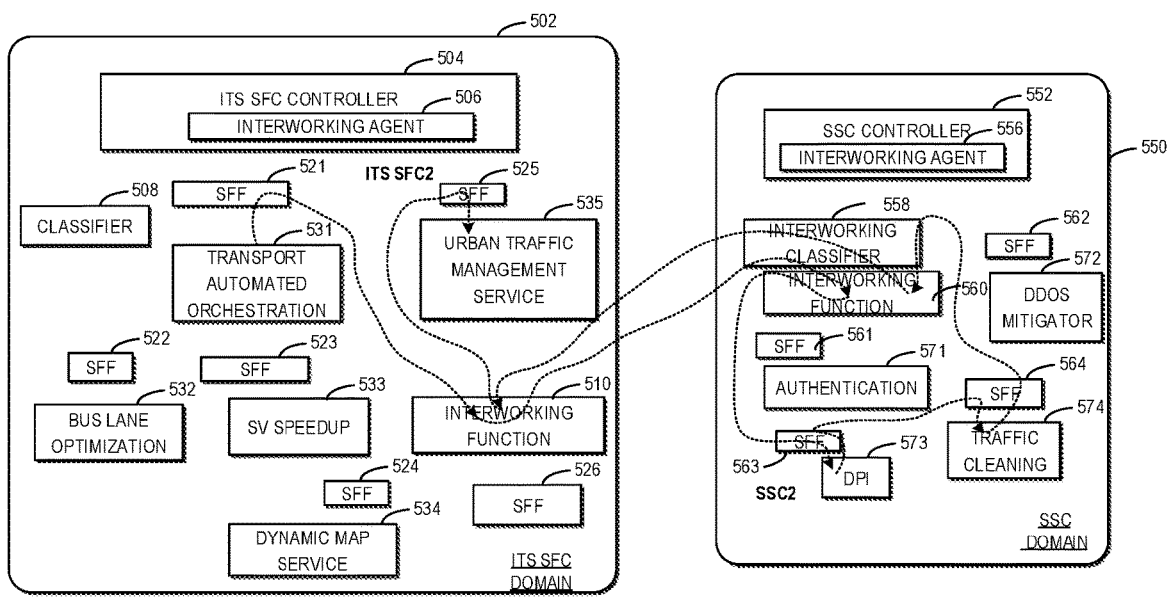
FIG. 6 illustrates an exemplary block diagram of a system for providing security services to intelligent transport service in accordance with embodiments of the present disclosure.

FIG. 6 illustrates a schematic diagram of operations for traffic cleaning in accordance with an embodiment of the present disclosure. FIG. 6 has a similar architecture with FIG. 5 and differs from FIG. 5 only in the use of different service function chains.

According to the ITS SFC2 as shown in FIG. 4, the Transport Automated Orchestration will continually check the congestion state in the route. If the congestion is heavy, a speedup RSU command will be sent to the Urban Traffic Management Service to control the traffic lights to be in green or reduce the time of red lights so as to relieve the congestion in the route.

However, the attacker may inject virus or malware into the speedup RSU command for the Urban Traffic Management Service. Accordingly, before the command is forwarded to the Urban Traffic Management Service, it is required to scan, detect and clean the flow/packet of the speedup RSU command for virus or malware. This may be implemented by combining the ITS SFC2 with the SSC2 in FIG. 6.

The path with the combination of SFC2 and SSC2 is: Transport Automated Orchestration 531→SFF 521→Interworking Function 510→Interworking Classifier 558 and Interworking Function 560→SFF 563→DPI 573→SFF 563→SFF 564→Traffic Cleaning 574→SFF 564→Interworking Classifier 558 and Interworking Function 560→SFC Interworking Function 510→SFF5 525→Urban Traffic Management Service.

The interworking function 510, upon receiving the packet/flow from the Transport Automated Orchestration 531, constructs an interworking NSH as shown in FIG. 10a. The interworking NSH comprises a flag (IW) indicating that the packet is an interworking packet, a flow identifier (IW_002), an IP address (301.108.9.12) of the interworking function 510 and the metadata associated with Security Service Chain (SSC2).

The interworking function 510 stores the mapping information as shown in Table 3 and forwards the flow/packet with the interworking NSH to the interworking classifier 558 and the interworking function 560.

According to the metadata within the Context Header 2 of the interworking NSH, the interworking classifier 558 selects the SSC2 and indicates that the SF (DPI or traffic cleaning) should return the flow/packet back to the interworking classifier 558 and the interworking function 560. The interworking function 560 converts the interworking NSH into the general NSH as shown in FIG. 10b. The general NSH comprises a flag (U) indicating that the packet is an interworking packet, a flow identifier (IW_026), an IP address (201.108.10.1) of the interworking classifier 580 and the interworking function 560, and metadata associated with the Security Service Chain (SSC2).

The interworking classifier 580 and the interworking function 560 may store the mapping information as shown in Table 4 and forward the packet/flow to the DPI 573.

According to "filtering rule: virus name," the DPI 573 scans the packet/flow and detects whether a virus exists in the packet/flow. If there is no virus, the DPI 573 will forward the packet/flow to the interworking classifier 558 and the interworking function 560. If there is a virus, the DPI 573 will forward the packet/flow to traffic cleaning 574 and the virus will be then deleted from the packet through the traffic cleaning. Afterwards, the traffic cleaning forwards the cleaned packet/flow to the interworking classifier 558 and the interworking function 560.

If the DPI determines that there is no virus, the NSH will be updated to the one as shown in FIG. 10c. The general NSH comprises a flag (U) indicating that the packet is an interworking packet, a flow identifier (IW_026), an IP address (201.108.10.1) of the interworking classifier 580 and the interworking function 560, and a response (no virus) to the metadata.

After the traffic cleaning 574 cleans up the virus, the NSH may be updated to the one as shown in FIG. 10d. The general NSH comprises a flag (U) indicating that the packet is an interworking packet, a flow identifier (IW_026), an IP address (201.108.10.1) of the interworking classifier 580 and the interworking function 560, and a response (virus removed) to the metadata.

The DPI 573 or the traffic cleaning 574 checks the field of the Fixed Length Context Header 1, searches the address of the interworking classifier 558 and the interworking function 560 and then forwards the packet/flow to the interworking classifier 558 and the interworking function 560. The interworking classifier 558 and the interworking function 560 convert the general NSH into the interworking NSH as shown in FIG. 10e. The interworking NSH comprises a flag (IW) indicating that the packet is an interworking packet, a flow identifier (IW_002), an IP address (301.108.9.12) of the interworking function 510 and a response (no virus or virus removed) to the metadata.

The interworking classifier 558 and the interworking function 560 forward the flow/packet of the interworking NSH to the interworking function 510 within the SFC domain 502 of the ITS. The interworking function 510 converts the interworking NSH into the general NSH as shown in FIG. 10f. The general NSH comprises a flag (U) indicating that the packet is a general packet and a response to the metadata. The interworking function 510 forwards the packet/flow with the interworking NSH to the Urban Traffic Management Service.

Figure 11:
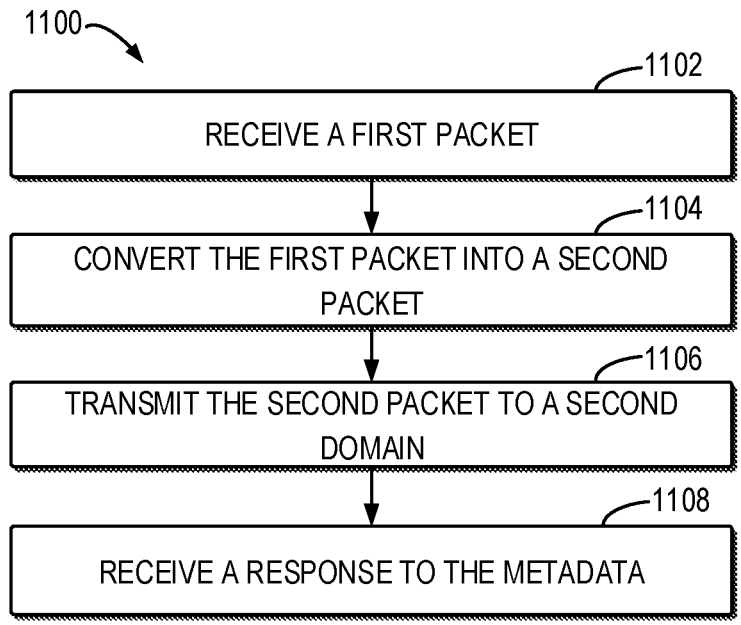
FIG. 11 illustrates a flowchart of a method for interworking between service function chain domains in accordance with embodiments of the present disclosure.

FIG. 11 illustrates a flowchart of a method 1100 for interworking between different domains in accordance with an embodiment of the present disclosure. The method 1100 may be implemented, for example, at the interworking function 310 as shown in FIG. 3 or the interworking function 510 as shown in FIGS. 5-6.

At block 1102, a first logic node of a first service chain in a first domain receives a first packet associated with a second service chain in a second domain. For example, the interworking function 510 of the first service chain (SFC1) in the SFC domain 502 receives a first packet associated with the second service chain (SSC1) in the SSC domain 550. The first packet is a general packet. In some embodiments, the second domain is a security service chain domain, as shown in FIGS. 3, 5 and 6. It should be understood that the second domain also may be other types of service chain domains, such as billing chain domain or Quality of Service (QoS) domain.

At block 1104, the first logic node converts the first packet into a second packet, and the second packet is an interworking packet comprising first interworking information between the first service chain and the second service chain. The first interworking information comprises a flag indicating that the second packet is an interworking packet, an address of the first logic node, a first flow identifier of the second packet, a first service path identifier of the second packet and metadata associated with the second service chain. For example, the second packet may comprise the interworking NSH as shown in FIGS. 9a and 10a.

At block 1106, the first logic node transmits the second packet to the second logic node in the second domain. For example, the interworking logic node 510 transmits the second packet to the interworking classifier 558 and the interworking function 560 in the SSC domain 550.

At block 1108, the first logic node receives from the second logic node a response to the metadata. For example, if the metadata is used for authentication, the response may be an indication of successful or failed authentication.

In some embodiments, the first logic node may further store the mapping information between the first service chain and the second service chain. The mapping information comprises at least one of: the first flow identifier of the second packet, the first service path identifier of the second packet, the identifier of the second domain, the address of the second logic node and the metadata associated with the second service chain. The mapping information may be, for example, as shown in Table 3.

In some embodiments, the first logic node may receive from the second logic node a third packet comprising second interworking information between the first service chain and the second service chain. The second interworking information comprises the first flow identifier, the first service path identifier and the response to the metadata. The third packet may comprise the extended NSH as shown in FIG. 9d and FIG. 10e. In some embodiments, the second service chain may further process the payload of the second packet. Correspondingly, the third packet comprises the payload processed by the second service chain. For example, in the embodiment of traffic cleaning as shown in FIG. 6, the second service chain (SSC2) may remove the virus from the second packet, such that the payload of the third packet will comprise the payload after removing the virus from the payload of the second packet.

In some embodiments, the first logic node converts the third packet into a fourth packet, which comprises a response to the metadata and a flag indicating that the fourth packet is a non-interworking packet. For example, the first logic node may convert the interworking packet into the general packet. The first logic node may transmit the fourth packet to the third logic node within the first service chain. The fourth packet may comprise the general NSH as shown in FIG. 9e and FIG. 10f.

Figure 12:
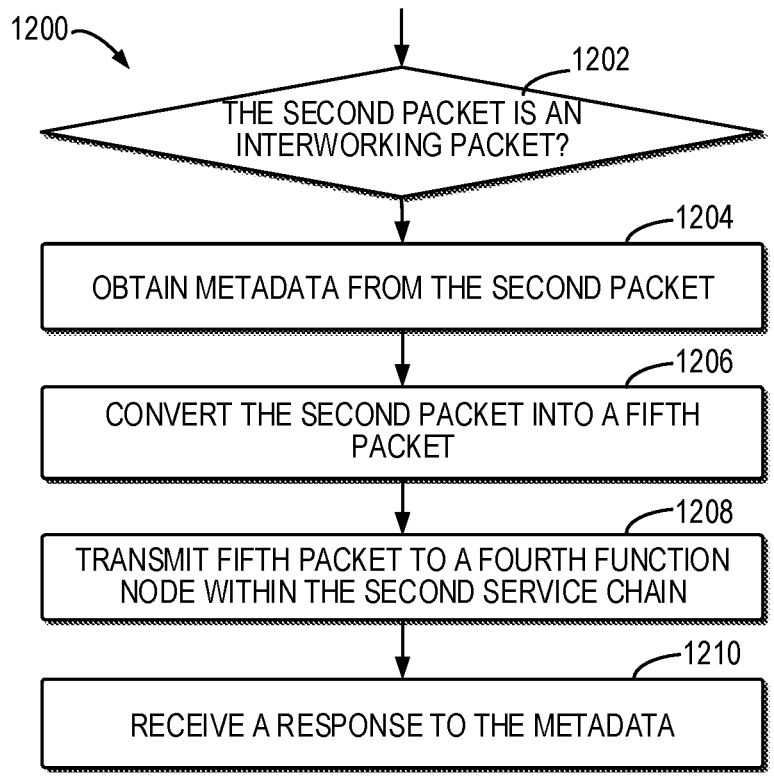
FIG. 12 illustrates a flowchart of a method for interworking between service function chain domains in accordance with embodiments of the present disclosure.

FIG. 12 illustrates a flowchart of a method 1200 for interworking between different domains in accordance with an embodiment of the present disclosure. The method 1200 may be implemented at the interworking classifier 358 and the interworking function 360 as shown in FIG. 3 or the interworking classifier 558 and the interworking function 560 as shown in FIGS. 5-6.

At block 1202, the second logic node of the second domain determines whether a received second packet is an interworking packet. For example, the second logic node may be the interworking classifier 558 and the interworking function 560 as shown in FIG. 5 or 6. For example, it may be determined, by checking the flag field, whether the packet is an interworking packet. The second packet may comprise the interworking NSH as shown in FIG. 9a or FIG. 10a. In some embodiments, the second domain is a Security Service Chain (SSC) domain. It should be understood that the second domain also may be other types of service chain domains, such as billing chain domain or Quality of Service (QoS) domain.

If it is determined that the second packet is the interworking packet, the method 1200 proceeds to block 1204. At block 1204, the second logic node obtains, from the second packet, the metadata associated with the second service chain in the second domain. For example, the interworking classifier 558 and the interworking function 560 may obtain, from the second packet, the metadata associated with the second service chain (e.g., SSC1) in the SSC domain 550. For example, in the case where the service chain SSC1 is used for authentication, the metadata may comprise information such as user name/authentication certificate and the like.

At block 1206, the second logic node converts the second packet into a fifth packet. The fifth packet is a general packet and comprises a flag indicating that the fifth packet is a non-interworking packet, a second flow identifier of the fifth packet, a second service path identifier of the fifth packet, an address of the second logic node and metadata associated with the second service chain. The fifth packet may comprise the general NSH as shown in FIG. 9b or FIG. 10b.

At block 1208, the second logic node forwards the fifth packet to the fourth logic node within the second service chain. The fourth logic node may be SFF 561 as shown in FIG. 5 or SFF 563 as shown in FIG. 6.

At block 1210, the second logic node receives a sixth packet from the fifth logic node within the second service chain. The sixth packet comprises the second flow identifier, the second service path identifier and a response to the metadata. The fifth logic node and the sixth logic node may be the same node or different nodes. For example, in the example as shown in FIG. 5, both the fifth logic node and the sixth logic node are SFF 561. However, in the example as shown in FIG. 6, the fifth logic node is SFF 561 while the sixth logic node is SFF 564 or SFF 561. The sixth packet may comprise the general NSH as shown in FIG. 9c or comprise the general NSH as shown in FIG. 10c or 10d. In some embodiments, the second service chain may further process the payload of the second packet. Correspondingly, the sixth packet comprises the payload processed by the second service chain. For example, in the embodiment as shown in FIG. 6, the second service chain (SSC2) may remove the virus from the second packet, such that the payload of the sixth packet will have the payload after removing the virus from the payload of the second packet.

In some embodiments, the second logic node may further store the mapping information between the second service chain and the first service chain in the first domain. The mapping information comprises at least one of: the first flow identifier within the first domain, the first flow identifier of the second packet, the first service path identifier of the second packet, the second flow identifier within the second domain, the second service path identifier, the address of the first logic node within the first domain from which the second packet is originated and the metadata associated with the second service chain.

In some embodiments, the second logic node converts the sixth packet into a third packet, which comprises interworking information between the first service chain and the second service chain. The interworking information comprises a flag indicating that the third packet is an interworking packet, the first service path identifier, the first flow identifier and the response to the metadata. The second logic node determines an address of the first logic node based on the mapping information. The second logic node transmits the third packet to the first logic node. For example, the third logic node may comprise the interworking NSH as shown in FIG. 9d or the interworking NSH as shown in FIG. 10e. In some embodiments, the second service chain may further process the payload of the second packet. Correspondingly, the third packet comprises the payload processed by the second service chain. For example, in the embodiment as shown in FIG. 6, the second service chain (SSC2) may remove the virus from the second packet, such that the payload of the third packet comprises the payload after removing the virus from the payload of the second packet.

In some embodiments, in response to determining that absence of the second service chain within the second domain, a request is transmitted to the controller to create the second service chain within the second domain.

Figure 13:
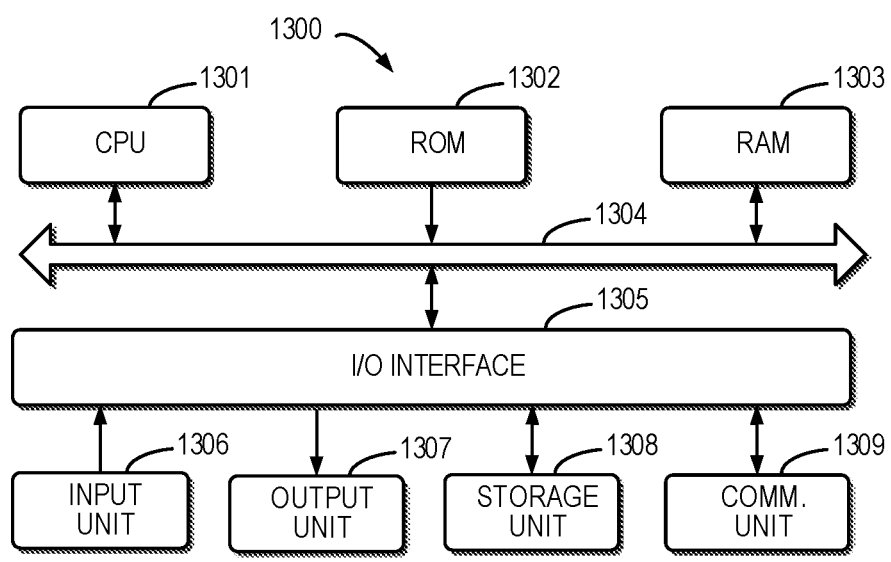
FIG. 13 illustrates a schematic block diagram of an example device for implementing embodiments of the present disclosure.

FIG. 13 illustrates a schematic block diagram of an example device 1300 for implementing embodiments of the present disclosure. As shown, the device 1300 comprises a central process unit (CPU) 1301, which may execute various suitable actions and processing based on the computer program instructions stored in the read-only memory (ROM) 1302 or computer program instructions loaded in the random-access memory (RAM) 1303 from a storage unit 1308. The RAM 1303 may also store all kinds of programs and data required by the operations of the device 1300. CPU 1301, ROM 1302 and RAM 1303 are connected to each other via a bus 1304. The input/output (I/O) interface 1305 is also connected to the bus 1304.

A plurality of components in the device 1300 is connected to the I/O interface 1305, comprising: an input unit 1306, such as keyboard, mouse and the like; an output unit 1307, e.g., various kinds of display and loudspeakers etc.; a storage unit 1308, such as memory disk, optical disk etc.; and a communication unit 1309, such as network card, modem, wireless transceiver and the like. The communication unit 1309 allows the device 1300 to exchange information/data with other devices via the computer network, such as Internet, and/or various telecommunication networks.

The above described various procedures and processing, such as method 1100/1200, may be executed by the processing unit 1301. For example, in some embodiments, method 1100 and/or 1200 may be implemented as computer software programs tangibly comprised in the machine-readable medium, such as storage unit 1308. In some embodiments, the computer program may be partially or fully loaded and/or mounted to the device 1300 via ROM 1302 and/or communication unit 1309. When the computer program is loaded to RAM 1303 and executed by the CPU 1301, one or more actions of the above described method 1100 and/or 1200 may be executed.

The present disclosure may be a method, apparatus, system and/or computer program product. The computer program product may comprise a computer-readable storage medium loaded with computer-readable program instructions for executing various aspects of the present disclosure.

The computer-readable storage medium may be a tangible apparatus that maintains and stores instructions utilized by the instruction executing apparatuses. The computer-readable storage medium may be, but not limited to, such as electrical storage device, magnetic storage device, optical storage device, electromagnetic storage device, semiconductor storage device or any appropriate combinations of the above. More concrete examples of the computer-readable storage medium (non-exhaustive list) comprise: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein may be downloaded from the computer-readable storage medium to each computing/processing device, or to an external computer or external storage via Internet, local area network, wide area network and/or wireless network. The network may comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combinations of one or more programming languages, wherein the programming languages comprise object-oriented programming languages, such as Smalltalk, C++ and the like, and traditional procedural programming languages, e.g., C language or similar programming languages. The computer-readable program instructions may be implemented fully on the user computer, partially on the user computer, as an independent software package, partially on the user computer and partially on the remote computer, or completely on the remote computer or server. In the case where remote computer is involved, the remote computer may be connected to the user computer via any type of networks, comprising local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit may execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram may be implemented by the computer-readable program instructions.

The computer-readable program instructions may be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions may also be stored in the computer-readable storage medium and cause the computer, programmable data processing apparatus and/or other devices to work in a particular manner, such that the computer-readable medium stored with instructions contains an article of manufacture, comprising instructions for implementing various aspects of the functions/actions stipulated in one or more blocks of the flow chart and/or block diagram.

The computer-readable program instructions may also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram may represent a module, a part of program segment or code, wherein the module and the part of program segment or code comprise one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

What is claimed is:

1. A method, comprising:
    receiving, at a first logic node of a first service chain in a first domain, a first packet associated with a second service chain in a second domain;
    converting the first packet into a second packet, the second packet comprising first interworking information between the first service chain and the second service chain, the first interworking information comprising a flag indicating that the second packet is an interworking packet, a first service path identifier of the second packet, an address of the first logic node, a first flow identifier of the second packet and metadata associated with the second service chain;
    transmitting the second packet to a second logic node in the second domain; and
    receiving from the second logic node a response to the metadata.

2. The method of claim 1, further comprising:
storing, at the first logic node, mapping information between the first service chain and the second service chain, the mapping information comprising at least one of:
a first service path identifier of the second packet;
a first flow identifier of the second packet;
an identifier of the second domain;
an address of the second logic node; or
metadata associated with the second service chain.

3. The method of claim 1, wherein receiving from the second logic node a response to the metadata comprises:
receiving from the second logic node a third packet comprising second interworking information between the first service chain and the second service chain, the second interworking information comprising the first service path identifier, the first flow identifier and the response to the metadata.

4. The method of claim 3, further comprising:
converting the third packet into a fourth packet, the fourth packet comprising the response to the metadata and a flag indicating that the fourth packet is a non-interworking packet; and
transmitting the fourth packet to a third logic node within the first service chain.

5. The method of claim 1, wherein the second domain is a security service chain domain, a billing chain domain or a Quality of Service (QoS) chain domain.

6. The method of claim 3, wherein the second packet comprises a first payload and the third packet further comprises a second payload, the second payload being the first payload processed by the second service chain.

7. A method, comprising:
at a second logic node in a second domain, in response to determining that a received second packet is an interworking packet, obtaining, from the second packet, metadata associated with a second service chain in the second domain;
converting the second packet into a fifth packet, the fifth packet comprising a flag indicating that the fifth packet is a non-interworking packet, a second flow identifier within the second domain, a second service path identifier within the second domain, an address of the second logic node and metadata associated with the second service chain;
forwarding the fifth packet to a fourth logic node within the second service chain; and
receiving a sixth packet from a fifth logic node within the second service chain, the sixth packet comprising the second flow identifier, the second service path identifier and a response to the metadata.

8. The method of claim 7, further comprising:
storing mapping information between the second service chain and a first service chain in a first domain, the mapping information comprising at least one of:
a first flow identifier of the second packet;
a first service path identifier of the second packet;
an identifier of the first domain;
a second flow identifier within the second domain;
a second service path identifier within the second domain;
an address of a first logic node within the first domain from which the second packet is originated; or
metadata associated with the second service chain.

9. The method of claim 8, further comprising:
converting the sixth packet into a third packet, the third packet comprising interworking information between the first service chain and the second service chain, the interworking information comprising a flag indicating that the third packet is an interworking packet, the first service path identifier, the first flow identifier and a response to the metadata;
determining an address of the first logic node based on the mapping information; and
transmitting the third packet to the first logic node.

10. The method of claim 7, further comprising:
in response to determining absence of the second service chain within the second domain, transmitting a request to a controller to create the second service chain within the second domain.

11. The method of claim 7, wherein the second domain is a security service chain domain, a billing chain domain or a Quality of Service (QoS) chain domain.

12. The method of claim 9, wherein the second packet comprises a first payload and the third packet further comprises a second payload, the second payload being the first payload processed by the second service chain.

13. A device for interworking between service function chain domains, comprising:
a processor; and
a memory having instructions stored therein which, when executed by the processor, cause the device to:
receive, at a first logic node of a first service chain in a first domain, a first packet associated with a second service chain in a second domain;
convert the first packet into a second packet, the second packet comprising first interworking information between the first service chain and the second service chain, the first interworking information comprising a flag indicating that the second packet is an interworking packet, a first service path identifier of the second packet, an address of the first logic node, a first flow identifier of the second packet and metadata associated with the second service chain;
transmit the second packet to a second logic node in the second domain; and
receive from the second logic node a response to the metadata.

14. The device of claim 13, wherein the instructions, when executed by the processor, further cause the device to:
store, at the first logic node, mapping information between the first service chain and the second service chain, the mapping information comprising at least one of:
a first flow identifier of the second packet;
a first service path identifier of the second packet;
an identifier of the second domain;
an address of the second logic node; or
metadata associated with the second service chain.

15. The device of claim 13, wherein receiving from the second logic node a response to the metadata comprises:
receiving from the second logic node a third packet, the third packet comprising second interworking information between the first service chain and the second service chain, the second interworking information comprising the first service path identifier, the first flow identifier and the response to the metadata.

16. The device of claim 15, wherein the instructions, when executed by the processor, further cause the device to:
convert the third packet into a fourth packet, the fourth packet comprising the response to the metadata and a flag indicating that the fourth packet is a non-interworking packet; and transmit the fourth packet to a third logic node within the first service chain.

17. The device of claim 13, wherein the second domain is a security service chain domain, a billing chain domain or a Quality of Service (QoS) chain domain.

18. The device of claim 15, wherein the second packet comprises a first payload and the third packet further comprises a second payload, the second payload being the first payload processed by the second service chain.

19. A device for interworking between service function chain domains, comprising:
    a processor; and
    a memory having instructions stored therein which, when executed by the processor, cause the device to:
        at a second logic node in a second domain, in response to determining that a received second packet is an interworking packet, obtain, from the second packet, metadata associated with a second service chain in the second domain;
        convert the second packet into a fifth packet, the fifth packet comprising a flag indicating that the fifth packet is a non-interworking packet, a second flow identifier within the second domain, the second service path identifier, an address of the second logic node and metadata associated with the second service chain;
        forward the fifth packet to a fourth logic node within the second service chain; and
        receive a sixth packet from a fifth logic node within the second service chain, the sixth packet comprising the second service path identifier, the second flow identifier and a response to the metadata.

20. The device of claim 19, wherein the instructions, when executed by the processor, further cause the device to:
    store mapping information between the second service chain and a first service chain within a first domain, the mapping information comprising at least one of:
        a first flow identifier of the second packet;
        a first service path identifier of a second packet;
        an identifier of the first domain;
        a second flow identifier within the second domain;
        a second service path identifier within the second domain;
        an address of a first logic node within the first domain from which the second packet is originated; or
        metadata associated with the second service chain.

21. The device of claim 20, wherein the instructions, when executed by the processor, further cause the device to:
    convert the sixth packet into a third packet, the third packet comprising interworking information between the first service chain and the second service chain, the interworking information comprising a flag indicating that the third packet is an interworking packet, the first service path identifier, the first flow identifier and a response to the metadata;
    determine an address of the first logic node based on the mapping information; and
    transmit the third packet to the first logic node.

22. The device of claim 19, wherein the instructions, when executed by the processor, further cause the device to:
    in response to determining absence of the second service chain within the second domain, transmit a request to a controller to create the second service chain within the second domain.

23. The device of claim 19, wherein the second domain is a security service chain domain, a billing chain domain or a Quality of Service (QoS) chain domain.

24. The device of claim 21, wherein the second packet comprises a first payload and a third packet further comprises a second payload, the second payload being the first payload processed by the second service chain.

25. A non-transitory computer-readable storage medium comprising instructions stored thereon that, when executed by at least one processor, are configured to cause a computing system to perform the method of claim 1.

26. A non-transitory computer-readable storage medium comprising instructions stored thereon that, when executed by at least one processor, are configured to cause a computing system to perform the method of claim 7.

* * * * *